N. STEPHENS.
Cement-Lined Pipes.
No. 155,473.  Patented Sept. 29, 1874.
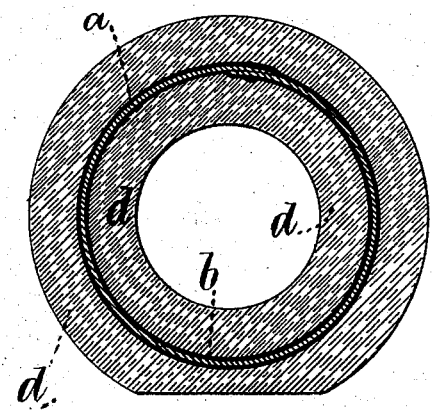
Witnesses
Chas H Smith
Geo. S. Pinckney
Inventor
Nathan Stephens
per Lemuel W. Serrell
atty

UNITED STATES PATENT OFFICE.

NATHAN STEPHENS, OF BROOKLYN, NEW YORK, ASSIGNOR TO MELVIN STEPHENS, OF SAME PLACE.

IMPROVEMENT IN CEMENT-LINED PIPES.

Specification forming part of Letters Patent No. 155,473, dated September 29, 1874; application filed April 22, 1874.

*To all whom it may concern:*

Be it known that I, NATHAN STEPHENS, of Brooklyn, in the county of Kings and State of New York, have invented an Improvement in Cement-Lined Pipe, of which the following is a specification:

Wrought-iron tubes have heretofore been lined and coated with hydraulic cement to form water-pipes, and cast-iron pipes have been coated both internally and externally with asphalt or other bituminous material.

I find that hydraulic cement will adhere to asphalt or similar bituminous material with great tenacity; and that, when the tube is coated with such bituminous material, the cement lining will adhere to the same nearly, if not quite, as well as it will to the wrought-iron; and there is a twofold advantage in coating such tube with such water-proof material previous to applying the cement. It, in the first place, fills any interstices in the iron or in the riveted joint, to render the same perfectly water-tight; and, secondly, the iron is protected from rust, either while exposed to the action of dampness during the manufacturing operation, or when put into use.

In the drawing, the cross-section of the pipe therein shown illustrates my improvement.

The tube *a* will usually be of wrought-iron, lapped and riveted, as shown; and upon this a coating or layer of asphalt, or similar water-proof or bituminous material, is applied, especially to the inside, as at *b*, but preferably on both inside and outside. The lining *d* of cement is applied to the layer *b* of water-proof material, and adheres firmly thereto.

The slightly-elastic character of asphalt, especially when mixed with coal-tar and heated, renders such coating especially adapted to preventing the cement lining *d* cracking under the ordinary circumstances of handling and laying.

The pipe prepared in this manner is a new and very useful article of manufacture. The lining of cement prevents the water tasting of the asphalt, and also strengthens the pipe, and prevents the same being bent by the external pressure.

I claim as my invention—

The lined tube, having an interior coating of bituminous material covered with the lining of cement, substantially as and for the purposes set forth.

Signed by me this 17th day of April, A. D. 1874.

NATHAN STEPHENS.

Witnesses:
 GEO. T. PINCKNEY,
 CHAS. H. SMITH.